United States Patent [19]

Stefanik

[11] 4,046,933
[45] Sept. 6, 1977

[54] LAMINATED WINDOW STRUCTURE AND ITS METHOD OF FABRICATION

[75] Inventor: John E. Stefanik, Lower Burrell, Pa.

[73] Assignee: PPG Industries, Inc., Pittsburgh, Pa.

[21] Appl. No.: 613,790

[22] Filed: Sept. 16, 1975

[51] Int. Cl.² ............................................. B32B 3/02
[52] U.S. Cl. ..................................... 428/81; 52/616; 156/107; 156/109; 156/313; 156/329; 219/203; 428/192; 428/246; 428/266; 428/285
[58] Field of Search ............... 428/81, 192, 246, 266, 428/332, 333, 339, 354, 391, 429, 448, 251, 252, 285; 156/107, 109, 313, 329; 52/616; 219/203

[56] References Cited

U.S. PATENT DOCUMENTS

| | | | |
|---|---|---|---|
| 3,061,490 | 10/1962 | Ryan | 428/429 |
| 3,074,903 | 1/1963 | Fincke et al. | 156/329 |
| 3,424,642 | 1/1969 | Orcutt | 156/107 |
| 3,616,122 | 10/1971 | Orcutt | 156/106 |
| 3,791,998 | 2/1974 | Bruns et al. | 428/447 |
| 3,919,022 | 11/1975 | Stefanik | 156/106 |

Primary Examiner—James J. Bell
Attorney, Agent, or Firm—Edward I. Mates

[57] ABSTRACT

In a transparent laminated window or canopy for aircraft and the like, flexible fabric tape impregnated with a silicone elastomeric adhesive applied against a surface of one of the plies or reinforcements of the window is used to bond at least one of the plies or reinforcements to another element of the laminated window or to a reinforcing frame of an aircraft panel which comprises the laminated window. Such tape is easier to apply during the assembly operation than previously used silicone pastes, thereby reducing the cost of fabricating aircraft panels incorporating said window or canopy without paying any unduly large penalty in adhesion between the elements of the panel.

7 Claims, 1 Drawing Figure

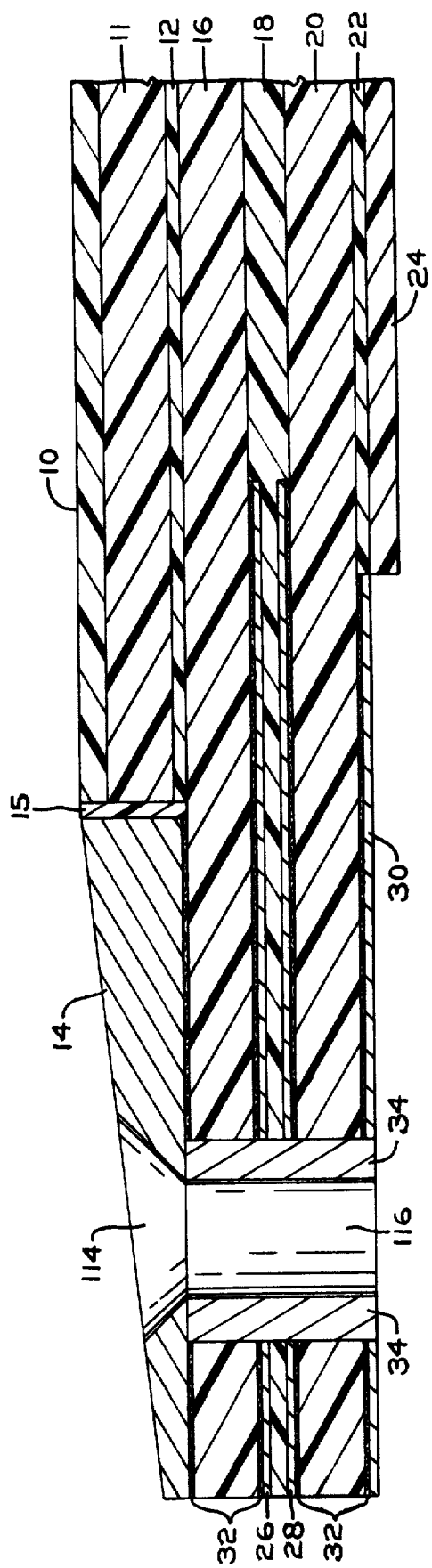

LAMINATED WINDOW STRUCTURE AND ITS METHOD OF FABRICATION

BACKGROUND OF THE INVENTION

1. Field of the Invention

This invention relates to panels comprising transparent laminated windows or canopies for aircraft, aircraft window panels comprising canopies or windows, and an improved method of fabricating such panels. Laminated aircraft windows or canopies usually comprise alternate plies of a rigid, transparent glazing material, such as glass or various well-known substitutes for glass (such as polycarbonates, acrylic esters and polyesters) alternating with plies of a flexible interlayer material, such as polyurethanes, polyvinyl acetals and silicones. The peripheral portions of certain plies are offset from one another in laminated aircraft windows and the extended marginal portion of the larger ply or plies of flexible interlayer material is reinforced with one or more frame-shaped reinforcing members of a material that is difficult to bond to one or both of the plies flanking the major surfaces of the reinforcing member in the laminated window.

In fabricating laminated windows for aircraft, not only must the alternate plies of rigid and flexible materials be bonded to one another and to the reinforcing members with sufficient adhesive strength to enable the laminated window to preserve its unitary integrity during use at various ranges of temperatures and pressures, but it is also necessary for the laminated window to remain attached securely to the body of the aircraft in which it is installed. It is especially important that the laminated window and its attachment to the aircraft body be reinforced structurally to minimize the likelihood of the window separating from the body of the aircraft. It is also important that any adhesive component of an aircraft panel be easy to apply to facilitate its fabrication.

For the purpose of this disclosure, the term "window" is limited to a laminate of transparent window elements including marginally located opaque or transparent reinforcing members that are incorporated within the thickness of the window. The term "panel" includes the window together with exterior reinforcing elements that bear at least a portion of the load in attaching the window to the body of the aircraft.

2. Description of the Prior Art

U.S. Pat. No. 2,360,192 to Bestian discloses the use of a fabric or paper which is impregnated with a liquid solution of an adhesive for bonding different substances. The adhesive comprises the reaction product of an isocyanate with an alkylene imine.

The general concept of using an adhesive impregnated strip to bond diverse substances is also disclosed in U.S. Pat. No. 3,516,884 to Heeter; U.S. Pat. No. 3,533,877 to Cook and U.S. Pat. No. 3,424,642 to Orcutt. The Orcutt patent uses resin impregnated tapes for mechanically and chemically sealing various components of aircraft windows, and specifically discloses using reinforced thermosetting resin in the A stage and in the B stage. The panels comprising the windows and the resin impregnated tapes are assembled, and during lamination of the panels under heat and pressure, the resins set into the C stage to form a unitary part of the resulting aircraft panel.

U.S. Pat. No. 3,312,574 to Laur and U.S. Pat. No. 3,313,587 to Wilson are typical of many patents disclosing the use of silicone rubber interlayers for laminated glass windows.

U.S. Pat. No. 3,074,903 to Fincke discloses the use of silicone resin impregnated fabric to form fabric reinforced laminated structures. This patent does not suggest using the impregnated fabric as a means for bonding the laminated structure to a structure receiving body or member.

U.S. Pat. No. 3,306,800 to Pleuddemann discloses the concept of using a polyorganic bonding agent having attached silyl groups for bonding thermoplastic resin, such as polycarbonate, to inorganic materials, such as glass, steel, aluminum, etc. The Pleuddemann patent does not suggest using the silyl-group containing bonding agent in the form of a resin impregnated fabric or tape.

U.S. Pat. No. 3,332,817 to Obenhaus discloses using silicone impregnated mica paper for making mica paper capacitors. This patent contemplates laminating foil sheet electrodes and spaces of reconstituted mica paper impregnated with a partially cured silicone resin. The laminate is then subjected to heat and pressure to cure the resin in situ.

SUMMARY OF THE INVENTION

According to the present invention, a thin fabric tape previously impregnated with a silicone elastomeric adhesive is applied when the adhesive is in a curable state against a surface of at least one of the elements of the laminated window, such as a reinforcing member or one of the plies of rigid, transparent glazing material, that is difficult to adhere to another element, to adhere the element to either another ply or a reinforcing member of the window or to adhere an exterior surface of the window to a rigid reinforcing member exterior of the window and composed of a material taken from the class consisting of metals, metal alloys and rigid plastics, including reinforced plastics. The rigid member may either be a reinforcing frame for the aircraft window that forms the aircraft panel or a portion of the body of the aircraft in which the window or panel is installed.

When windows are installed in supersonic aircraft, they are exposed to a wide range of temperatures. A typical range of exposure can include temperatures as high as 380° F (193° C) and as low as about −90° F (−68° C). Silicones are excellent bonding agents throughout this wide temperature range. They are capable of withstanding temperatures as high as 400° F (204° C) without mechanical or physical deterioration. They remain flexible despite exposure at the lower temperatures of the normal range of temperature exposures for aircraft, whereas other well-known adhesives, such as polyvinyl butyral and epoxy resins, become brittle and break their bond with other substances.

Silicone bonding agents have been used to adhere glass to other materials because their flexibility minimizes chipping of the glass as a result of large temperature variations during use of the laminated window. Furthermore, silicone resins have a high rate of elongation under a wide temperature range, which allows a bonding layer of the silicone to remain adhered to dissimilar materials having substantially different thermal expansion coefficients even under conditions involving widely varying temperatures.

When silicone is applied in paste form, it is difficult to maintain a constant thickness for the applied silicone. This causes the resulting adhesive layer to have uneven thickness. Uneven thickness in an adhesive layer has been associated with the establishment of localized stresses and uneven bond strength. When an aircraft is exposed to exterior forces which establish stresses in the adhesive layer, a nonuniform adhesive bond is more likely to become disrupted in the areas of relatively weak bonding and cause damage to the window in the areas of relatively strong bonding than when such exterior forces establish stresses in an adhesive layer of more uniform bonding strength. Therefore, prior to the present invention, considerable care had to be taken to insure that the paste was applied at a uniform thickness throughout its extent to avoid the problems resulting from variations in thickness of the applied paste. Hence, considerable time was spent in this aspect of panel fabrication to insure that the paste had uniform thickness. Unless experienced personnel was used for this step, considerable difficulty existed in the resulting panel.

The present invention applies a fabric reinforced silicone tape which provides a strip of adhesive material having a much more uniform thickness than the material that results from the application by inexperienced personnel of the silicone adhesive in paste form. The silicone resin permeates through the fabric reinforcement so that, in addition to providing uniform adhesion between the laminated window and a rigid structure to which the peripheral portion of the window is attached, the impregnated fabric reinforces the laminated window structurally where the tape is applied without sacrificing the benefits of flexibility and a high elongation under a wide temperature range that characterize the silicone resin. The resulting impregnated tape provides less localized stress in the laminated window due to thickness variations of the adhesive layer. In addition, where the silicone is applied near the vision area adjacent to a marginal portion where reinforcement is required to bond adjacent plies of the laminated window to one another and/or to a reinforcing frame of the panel, better optical properties result in the adjacent vision area.

Silicone impregnated fabric tape is easy to handle. It can be unrolled from a roll and applied to an interfacial surface where desired. The roll can be easily stored until ready for use. The shelf life of silicone impregnated tapes is much greater than those of other adhesives, such as RTV silicones. The latter must be made by mixing two or more components thereof shortly before use.

Silicone impregnated fabric tapes can be cut into any desired pattern of adhesion. There is not nearly as much waste in using silicone impregnated fabric tapes according to the present invention as there is in mixing ingredients to form a liquid paste and then applying the paste. The volume of paste that must be prepared for any particular window or panel would probably be in excess of that actually required for a particular window or panel, and the short shelf life of the paste would make it unfeasible to use any surplus for future fabrication. In addition, silicone impregnated fabric tapes are available commercially and are generally less costly than silicone pastes.

Finally, the adhesion obtained with laminates substituting silicone impregnated fabric tapes for silicone pastes are adequate for the requirements of aircraft panels. Any difference in adhesion between panels comprising silicone paste as an adhesive component and those comprising silicone impregnated fabric tape in equivalent locations is not sufficient to render unacceptable for use panels of the latter type that conform to the present invention.

The benefits of the present invention will be understood more clearly in the light of a description of a preferred embodiment of this invention, which follows.

BRIEF DESCRIPTION OF THE DRAWING

The drawing, which forms part of the description of a preferred illustrative embodiment, is an enlarged, cross-sectional view of an edge portion of a panel comprising a reinforced laminated aircraft window to be installed in an aircraft body according to the present invention.

DESCRIPTION OF THE PREFERRED EMBODIMENTS

Referring to the drawing, a laminated window conforming to the present invention comprises a number of window elements laminated together. The outermost element is a first sheet 10 of acrylic plastic, such as polymethyl methacrylate, having a thickness of 60 mils (1.524 mm) forming the outward facing ply of a laminated window. The acrylic plastic sheet 10 is fuse welded to an outer surface of a coextensive sheet 11 of polycarbonate 125 mils (3.175 mm) thick. A sheet 12 of polyester urethane coextensive in area with the sheets 10 and 11 and having a thickness of 30 mils (0.762 mm) is bonded to the inner surface of the sheet 10 of acrylic plastic. An aluminum reinforcing frame 14, that tapers in thickness, surrounds the periphery of the acrylic plastic sheet 10, the polycarbonate sheet 11 and the polyester urethane sheet 12 to form an element of the panel which includes the laminated window.

A sealant 15, of a polysulfide composition or a fluorosilicone composition of the type sold under the trademark RTV 94-002, bonds the inner periphery of the frame 14 to the outer peripheries of sheets 10, 11 and 12. A second sheet of polycarbonate 16 having a thickness of 125 mils (3.175 mm) is bonded to the inner surface of the sheet 12 of polyester urethane. Another sheet of polyester urethane 18 having a thickness of 90 mils (2.286 mm) is laminated between the second sheet of polycarbonate 16 and a third sheet of polycarbonate 20 identical in thickness to the first sheet 11 and the second sheet 16. On the other side of the polycarbonate sheet 20, there is laminated another sheet 22 of polyester urethane 30 mils (0.762 mm) thick. Bonded to the outward facing surface of the polyester urethane sheet 22 is another sheet of acrylic plastic 24 having the same thickness as acrylic plastic sheet 10.

The polycarbonate sheets 16 and 20 and the relatively thick sheet 18 of polyester urethane extend beyond the margins of the acrylic plastic sheets 10 and 24, the polycarbonate sheet 11 and the relatively thin sheets 12 and 22 of polyester urethane. The relatively thick sheet 18 of polyester urethane is reduced in thickness near its periphery by providing two recessed portions in its marginal edge portion to receive a pair of reinforcing frames 26 and 28 having a width of 1.875 inches (47.625 mm) and a thickness of 20 mils (0.508 mm) in the recessed portions facing the extended marginal portions of the opposite polycarbonate sheets 16 and 20. Another reinforcing frame 30 similar in dimensions to reinforcing frames 26 and 28 is bonded to the marginal portion of an exposed surface of polycarbonate sheet 20. The reinforcing frames 26, 28 and 30 may be made of any rigid reinforcing material, such as aluminum, titanium or a thermosetting epoxy resin, and are difficult to adhere to the rigid, transparent elements of the window, such as the polycarbonate plies 16 and 20. In the past, adhering the reinforcing members to the rigid, transparent elements of the window or either the former or the latter to exterior reinforcements, such as the aluminum reinforcing frame 14, has provided problems.

The structure described to this point is a typical, conventional aircraft panel comprising a multi-layered window for aircraft and having alternating plies of rigid, transparent material (acrylic plastic sheets 10 and 24 and polycarbonate sheets 11, 16 and 20) alternating with flexible sheets of interlayer material (polyester urethane sheets 12, 18 and 22) and also including reinforcement frame shaped members (metal or cured epoxy resin members 26, 28 and 30) located in recessed marginal portions of the flexible sheet 18 or applied to rigid sheet 20. Prior to the present invention, paste-like adhesives had been used to bond the marginal portion of the exterior facing surface of the marginal portion of polycarbonate sheet 16 to the aluminum reinforcing frame 14 and to bond the reinforcement members 26, 28 and 30 to adjacent surfaces of the polycarbonate sheets 16 and 20. According to the present invention, however, the outward facing surface of polycarbonate sheet 16 is bonded to the interior surface of the aluminum reinforcing frame 14 (or, in the alternate, the inwardly facing surface of the portion of the aircraft body that surrounds the laminated aircraft window) with a thin, flexible tape 32 of fabric impregnated with a silicone elastomeric adhesive. The impregnated tape 32 has a substantially uniform thickness of approximately 10 mils (0.254 mm). Additional impregnated tapes 32 of substantially uniform thickness are used to bond reinforcement member 26 to the marginal portion of polycarbonate sheet 16 and to bond reinforcement members 28 and 30 to the opposite surfaces of the marginal portion of polycarbonate sheet 20.

The aluminum reinforcing frame 14 of the window panel has tapered apertures 114 that are aligned with corresponding countersunk apertures 116 in polycarbonate sheets 16 and 20 and in reinforcing frame members 26, 28 and 30. The aligned apertures shown in the drawing form one of several sets of spaced aligned apertures spaced approximately 1.2 inches (30.48 mm) apart center to center along the length of the periphery of the laminated window and the aluminum reinforcing frame. The apertures in the window elements have a larger diameter than those in the frame 14. A bushing 34 is provided for each set of apertures in the window elements to fill the space between the walls of the larger apertures and extensions of the walls of the apertures of the frame 14 extending through the thickness of the window. An attachment member (not shown) extends through each aperture in frame 14 and the bushing 34.

A laminated aircraft window of the type depicted in the drawing is laminated by assembling the various elements without apertures 114 and 116 and without bushing 34 in the order shown in the drawing. Any recessed peripheral portions, such as the portion surrounding the sheet of acrylic plastic 24 and the tapered outer portion of aluminum frame 14 are covered with removable material, such as cardboard, to provide uniform thickness around the margin. The resulting assembly is then taped around its margin and the taped assembly inserted in a laminating bag of the type disclosed in U.S. Pat. No. 3,311,517 to Keslar and Rankin. The bag used for lamination comprises an outer ply of polyethylene glycol terephthlate, commonly known by the trademark Mylar and an inner ply of polyethylene bonded to the Mylar. The bag has a total thickness not exceeding 5 mils (0.127 mm). The bag containing the assembly is evacuated and the evacuated bag sealed. The bag may be inserted within a second outer laminating bag similar in structure to the first laminating bag, if desired, and the second laminating bag is evacuated and sealed. The sealed unit is placed in an oil autoclave and exposed to a pressure of 200 psi (976 Kg/m$^2$) at a temperature of 275° to 300° F (135° to 149° C) for 45 minutes. Each unit so treated is cooled in the autoclave with the elevated pressure maintained until the temperature is reduced to 150° F (65° C). The pressure is then reduced and the unit removed from the autoclave.

The bag is opened and the assembly removed. Tapered holes 114 are drilled in the frame 14 and countersunk holes are drilled in alignment through the other elements of the laminated assembly.

The following experiments are performed to evaluate the adhesive properties of the silicone impregnated fabric tapes compared to silicone pastes. In the first test, two square sheets of polycarbonate 12 inches (304.8 mm) on each side and having a thickness of 3/16 inch (4.7625 mm) is covered completely on both surfaces. One of the sheets, the control sample, is covered with a silicone paste available under the trademark RTV-630. The other sheet, the test sample, has its whole area covered on both surfaces with a fabric tape impregnated with silicone available on the market under the trademark P-5620Q. The paste is applied carefully to a thickness of approximately 10 mils (0.254 mm) whereas the thickness of the silicone impregnated tape is approximately the same. A stiffening bar of metal approximately 1¼ inch (31.75 mm) wide extending completely across a dimension of the polycarbonate sheet is bolted to the sheet at ten equally spaced bolt holes, each having a diameter of 3/16 inch (approximately 4.76 mm) spaced approximately 1⅛ inch (approximately 28.6 mm) apart. The stiffening bar, in each instance, is located with its inner edge displaced approximately ⅞ inch (approximately 22.2 mm) offset from the center line of the sample. Both the test sample and the control sample are impacted with a titanium missile having a rounded head of approximately 1 inch in diameter weighing 150 grams and covered with a urethane resin covering. At an impact of 266 mph (492.6 Km/hr) for the test sample and an impact of 275 mph (509.2 Km/hr) for the control sample, each sample develops a ductile bulge having a diameter of approximately 1.25 inches (31.75 mm) and approximately 0.75 inch (19.05 mm) deep. Both the silicone paste of the control sample and the silicone impregnated tape of the test sample maintain their bond to the polycarbonate.

An additional impact test is made with laminated test samples 8.75 inches (approximately 222 mm) long and 4.8 inches (approximately 122 mm) wide. The polyurethane sheet, in each instance 30 mils (0.762 mm) thick, is assembled with an epoxy resin reinforcement strap 20 mils (0.508 mm) thick on each side of the polycarbonate sheet. The test specimen has the 20 mils (0.508 mm) thick, 1.25 inch (31.75 mm) wide epoxy straps laminated along the opposite side edges of the polycarbonate sheet, the control sample using a silicone paste (RTV-630) applied as carefully as possible to insure uniform thickness of 10 mils (0.254 mm), and the test sample using the silicone impregnated tape at the interface between each epoxy strap and the polycarbonate sheet. As in the first test, the parts are assembled and laminated in an autoclave at 200 psi (976 Kg/m²) and 300° F (approximately 149° C). Both the control sample and the test sample develop the same result when impacted with the titanium missile at 266 mph (492.6 Km/hr).

Another test for measuring the adhesion is known as the Tensile Test. The Tensile Test machine comprises a pair of adapter plates, each bolted to one set of apertures at each side of the sample. One adapter plate is separated from the other in a direction parallel to the major surface of the sample by a constantly increasing force in pounds per linear inch.

The tensile strength may also be converted to kilograms/linear meter.

For this test, control and test samples are made by assembling two sheets of polycarbonate, each having a length of 8.75 inches (222.25 mm) and a width of 4.8 inches (121.92 mm) and a thickness of 0.125 inch (3.175 mm) on opposite sides of a sheet of polyurethane 0.090 inch (22.86 mm) having a recess 1.875 inch (47.625 mm) and 30 mils (0.762 mm) deep along each major surface and along each of the opposite edges thereof to receive a reinforcing strap of epoxy 20 mils (0.508 mm) thick and an adhesive layer 10 mils (0.254 mm) thick. An additional pair of epoxy resin straps 1.875 inch (47.625 mm) wide and 20 mils (0.508 mm) thick is adhered along the opposite end portions of each sample and a 60 mil (1.524 mm) thick sheet of acrylic plastic (Plexiglas II) is adhered to the outer surface of the polycarbonate sheet flanked by the epoxy straps with a sheet of polyester urethane 30 mils (0.762 mm) thick in the portion between the inner edges of the latter pair of epoxy straps. One of a pair of aluminum retainers 1.25 inch (31.75 mm) wide and ⅛ inch (3.175 mm) thick is mounted along each of the narrow ends of each sample. The aluminum retainers are bonded to the marginal portions of the outer surface of the other polycarbonate sheet of the test or control samples by an adhesive 10 mils (0.254 mm) thick. Between the inner ends of the aluminum retainers, another sheet of acrylic plastic (Plexiglas II) having a thickness of 60 mils (1.524 mm) is bonded to the central portion of the polycarbonate sheet using a 30 mil (0.762 mm) thick sheet of polyurethane as the adhesive.

Each control and test sample is prepared for assembly by abrading the surfaces of the polycarbonate sheets along their marginal edges with by using silicone paste approximately 10 mils (0.254 mm) thick along each marginal edge portion of each surface of each polycarbonate sheet in the sample. After the elements are assembled in the manner specified, the assemblies are taped, inserted in a laminating bag of the type described previously and subjected to 200 psi (976 Kg/m²) at 300° F (approximately 149° C). Each sample is subjected to the pull test either at −65° C (approximately −54° C) or 220° F (approximately 104° C) or 260° F (approximately 127° C).

Table I entitled "Tensile Test Results" provides the results of these tests. In the Table, under the heading "SAMPLE," the term "Control" relates to a laminate that incorporates a silicone paste at each interfacial surface between a reinforcing frame and a polycarbonate surface; the term "Test" indicates the use at each said interfacial surface of a silicone impregnated tape; and the term "Combination" indicates a laminate using a silicone paste at the aluminum reinforcing frame interface and a tape at the other end of the aforesaid interfaces; and under the heading "PREPARATION," the term "Crocus" indicates that the polycarbonate surfaces are prepared by rubbing with crocus cloth; and the term "Garnet" indicates that the polycarbonate surfaces are prepared by abrading with garnet. All samples tested for impact or tensile tests reported herein are primed with a well-known silicone primer before applying either the silicone paste or the silicone impregnated tape. The silicone primer used for these tests is one available commercially as General Electric SS-4120 primer; the paste is purchased as General Electric RTV-630 and the silicone impregnated tape is purchased as PERMACEL P-5620Q tape, which is impregnated with General Electric SE-1175 silicone.

TABLE I

TENSILE TEST RESULTS

| SAMPLE | PREPARATION | TEMP. | EDGE STRENGTH (LBS./LINEAL INCH) YIELD | ULTIMATE | PREDOMINANT FAILURE |
| --- | --- | --- | --- | --- | --- |
| Control | Crocus | −65° F | >2083 | >2083* | Stress Crazing at Bolt Holes |
| Control | Crocus | 220° F | 1167 | 1474 | Bolt Hole Tearout |
| Control | Crocus | 260° F | 833 | 941 | Polycarbonate Tensile Failure |
| Test | Crocus | −65° F | >2083 | >2083* | Stress Crazing at Bolt Holes |
| Test | Crocus | 220° F | 1031 | 1116 | Adhesion to Aluminum Retainer. Bolt Hole Tearout |
| Test | Crocus | 260° F | 677 | 833 | Adhesion to Aluminum Retainer. Bolt Hole Tearout |
| Test | Garnet | −65° F | >2083 | >2083* | Stress Crazing at Bolt Holes |
| Test | Garnet | 220° F | 1010 | 1067 | Adhesion to Aluminum Retainer. Bolt Hole Tearout |
| Test | Garnet | 260° F | 667 | 792 | Adhesion to Aluminum Retainer. Bolt Hole Tearout |
| Combination | Crocus | 220° F | 1104 | 1320 | Bond to Aluminum Retainer; Bolt Hole Tearout |
| Combination | Crocus | 220° F | 1208 | 1296 | Polycarbonate tensile failure |
| Combination | Crocus | 260° F | 906 | 1041 | Polycarbonate tensile failure |
| Combination | Crocus | 260° F | 896 | 1169 | Polycarbonate tensile failure |

*LIMIT OF TEST MACHINE, NO SAMPLE FAILURE

The sizes of the ductile bulges obtained in the impact tests described earlier in this disclosure are equal to that measured in an impact test at 264 mph (158.4 Km/hr) performed on an uncoated polycarbonate sheet of the same dimensions and reinforced in an identical manner to that of the other samples impacted. It is deduced from the tensile strength tests that the silicone impregnated tape, which is easier to apply than the silicone paste, provides an adequate bond between the interior reinforcement frames comparable to those obtained with the prior art silicone pastes that are more difficult to apply.

The polyester urethanes of the panels of the present invention are generally of the type described in Examples 1-20 of U.S. Pat. No. 3,808,077 to Rieser and Chabal, although the interlayer material may be composed of a polyvinyl acetal of the class described at column 12 line 32 to column 13 line 35 of the aforesaid patent plasticized with plasticizers described at column 13 lines 36 to 62 of the aforesaid patent. Reference is made to said Rieser and Chabal patent for a more detailed description of the interlayer materials and their method of fabrication, which description is incorporated herein by reference to said patent. As another alternative, the interlayer material may be composed of an organosilicon composition, such as one containing an organosilicon compound incorporated or admixed in an ethylene-vinyl acetate copolymer as described at page 16 line 30 to page 22 line 17 of Canadian Pat. No. 909,125 to Snedeker et al., the disclosure of which is incorporated herein by reference.

The polycarbonate plies may be composed of sheets of polycarbonate, such as those compositions disclosed at column 4 line 28 to column 5 line 65 of U.S. Pat. No. 3,657,057 to Shorr and Littell, together with their method of manufacture. The aforesaid description taken from said Shorr and Littell patent is incorporated herein by reference.

The acrylic outer sheets are preferably composed of polymethyl methacrylate. However, any transparent material having relatively high abrasion resistance can be substituted for the polymethyl methacrylate. Typical examples of suitable abrasion resistant materials are described in the aforesaid Canadian Pat. No. 909,125 at page 22 line 19 to page 23 line 18 and the description thereof is incorporated by reference.

While the exact composition of the General Electric SE-1175 silicone that is used to impregnate the PERMACEL P-5620Q tape is not known, it is believed to contain one or more compounds similar, if not identical, in composition to the organosilicon compounds recited at page 16 line 30 to page 22 line 17 of the aforesaid Canadian Pat. No. 909,125.

The form of the invention shown and described in this disclosure represents an illustrative preferred embodiment and certain modifications thereof. It is understood that various changes, such as in dimensions, in composition of the elements forming the laminate and of the composition used to impregnate the fabric tape, for example, may be made without departing from the gist of the invention as defined in the claimed subject matter that follows:

I claim:

1. A transparent laminated window or canopy for aircraft and the like comprising a vision area comprising alternate plies of a rigid, transparent glazing material selected from the class consisting of glass, polycarbonates, acrylic esters and polyesters, and of a flexible interlayer material selected from the class consisting of polyurethanes, silicones and polyvinyl acetals and a marginal edge portion unitary with and surrounding said vision area and comprising a reinforcement member bonded to a ply of said interlayer material and a fabric tape impregnated with a silicone elastomeric adhesive and having substantially uniform thickness after said fabric is impregnated bonded between said reinforcing member and an adjacent surface of one of said plies of rigid, transparent glazing material, said ply of interlayer material being reduced in thickness in said marginal edge portion along one surface thereof to receive said reinforcing member.

2. A transparent laminated window or canopy as in claim 1, further including a second reinforcing member bonded to said ply of said interlayer material in said marginal edge portion and a second fabric tape impregnated with a silicone elastomeric adhesive and having substantially uniform thickness after said fabric is impregnated bonded between said second reinforcing member and an adjacent surface of a second of said plies of rigid, transparent glazing material, said ply of interlayer material being reduced in thickness in said marginal edge portion along its surface opposite said one surface thereof to receive said second reinforcing member.

3. A transparent laminated window or canopy as in claim 2, further including a third fabric tape impregnated with a silicone elastomeric adhesive and having substantially uniform thickness after said fabric is impregnated bonded to the marginal portion of a surface opposite one of said adjacent surfaces of one of said plies of rigid, transparent glazing material, and a third reinforcing member in said marginal edge portion bonded to said third fabric tape.

4. A transparent laminated window or canopy as in claim 2, further including third and fourth fabric tapes, each impregnated with a silicone elastomeric adhesive and having substantially uniform thickness after said fabric is impregnated, said third tape being bonded to the marginal portion of a surface opposite one of said adjacent surfaces of said one of said plies of rigid, transparent glazing material, a third reinforcing member in said marginal edge portion bonded to said third fabric tape, said fourth tape being bonded to the marginal portion of a surface opposite said other of said adjacent surfaces of said second of said plies of rigid, transparent glazing material and a fourth reinforcing member in said marginal edge portion bonded to said fourth fabric tape.

5. A method of fabricating a laminated transparent window or canopy for aircraft or the like comprising assembling a plurality of alternate plies of a rigid, transparent glazing material selected from the class consisting of glass, polycarbonates, acrylic esters and polyesters, alternating with plies of a flexible interlayer material selected from the class consisting of polyurethanes, silicones, and polyvinyl acetals, wherein at least one of said plies of flexible interlayer material has a marginal portion of reduced thickness, applying a reinforcing member to said marginal portion of reduced thickness, applying an impregnated flexible fabric tape impregnated with a silicone elastomeric adhesive in a curable state and having substantially uniform thickness after said tape is impregnated between said reinforcing member and the marginal portion of an adjacent ply of said rigid, transparent glazing material to form an assembly to be laminated, and laminating said assembly under sufficient heat and pressure for sufficient time to cure said silicone elastomeric adhesive and to adhere said alternate plies to one another to form a unitary structure having a transparent vision area within said marginal edge portion.

6. A method as in claim 5, wherein at least one of said plies of interlayer material is reduced in thickness along both surfaces of its marginal edge portion to provide two recessed portions in said marginal edge portion, further including applying a reinforcing member to each of said recessed portions and applying an impregnated flexible fabric tape impregnated with a silicone elastomeric adhesive in a curable state and having substantially uniform thickness after said tape is impregnated between each said reinforcing member and the marginal portion of each ply of said rigid, transparent glazing material adjacent to each of said reinforcing members prior to said laminating.

7. A method as in claim 6, further playing against the marginal edge portion of the surface of each of said plies of said rigid, transparent glazing material opposite the surfaces to which said tape is applied additional tape similar to said previously applied tape and applying an additional reinforcing member against each said additional tape prior to said laminating.

* * * * *